United States Patent
Lambert et al.

(10) Patent No.: US 12,215,730 B2
(45) Date of Patent: Feb. 4, 2025

(54) FASTENER ASSEMBLY

(71) Applicant: Advanced Wheel Locks LLC, Crown Point, IN (US)

(72) Inventors: Jon Lambert, Crown Point, IN (US); Kent Troxel, Highland, IN (US)

(73) Assignee: Advanced Wheel Locks LLC, Crown Point, IN (US)

( * ) Notice: Subject to any disclaimer, the term of this patent is extended or adjusted under 35 U.S.C. 154(b) by 242 days.

(21) Appl. No.: 17/888,407

(22) Filed: Aug. 15, 2022

(65) Prior Publication Data

US 2023/0056188 A1 Feb. 23, 2023

Related U.S. Application Data

(60) Provisional application No. 63/233,865, filed on Aug. 17, 2021.

(51) Int. Cl.
*F16B 41/00* (2006.01)
*B60B 3/16* (2006.01)
*F16B 37/14* (2006.01)

(52) U.S. Cl.
CPC ................ *F16B 41/005* (2013.01)

(58) Field of Classification Search
CPC ........ F16B 41/005; F16B 23/00; F16B 35/06; F16B 37/14; F16B 37/145; B60B 2900/3318; B60B 3/165
USPC .......... 411/372.5, 372.6, 373, 374, 396, 410, 411/429, 533
See application file for complete search history.

(56) References Cited

U.S. PATENT DOCUMENTS

| | | | | |
|---|---|---|---|---|
| 4,824,305 A | * | 4/1989 | McCauley | ............... B60B 7/00 411/908 |
| 4,969,788 A | * | 11/1990 | Goiny | .................... F16B 43/00 411/533 |
| 8,888,430 B2 | * | 11/2014 | Groppo | .................. B60B 3/165 70/231 |
| 10,274,001 B2 | | 4/2019 | Lambert | |
| 2004/0165967 A1 | * | 8/2004 | Winker | ................... F16B 37/14 411/372.5 |
| 2014/0363255 A1 | * | 12/2014 | Kishida | ................ F16B 5/0275 411/372.6 |

FOREIGN PATENT DOCUMENTS

| | | | | |
|---|---|---|---|---|
| EP | 3282138 A1 | * | 2/2018 | ............. F16B 37/14 |
| WO | WO-2016166575 A1 | * | 10/2016 | ............. B60B 3/165 |
| WO | WO-2018033843 A1 | * | 2/2018 | ............. F16B 23/00 |

* cited by examiner

*Primary Examiner* — William D Hutton, Jr.
*Assistant Examiner* — Carl J Carlson
(74) *Attorney, Agent, or Firm* — Michael Best & Friedrich LLP (57) ABSTRACT

A fastener assembly includes a threaded fastener having a threaded shaft and a head coupled to the threaded shaft, an engagement member having a central cavity and an outer profile having a plurality of notches cut therein to define an engagement feature that is engageable by a torquing member, a retention member configured to engage the engagement member and retain the head of the threaded fastener within the central cavity of the engagement member, and a lower base threaded on the threaded shaft and into abutment with the engagement member and/or the retention member.

20 Claims, 10 Drawing Sheets

FASTENER ASSEMBLY

CROSS-REFERENCE TO RELATED APPLICATIONS

This application claims priority to U.S. Provisional Patent App. No. 63/233,865, filed Aug. 17, 2021, the entire contents of which are herein incorporated by reference.

BACKGROUND OF THE INVENTION

Fasteners are used to hold objects together. Some fasteners are intended to be attached and detached so the objects being held together with the fasteners could be disassembled. The handling of fasteners is done by any one of many common tools. For instance, wrenches, pliers, screwdrivers, power tools and the like are used in various ways on nuts, a familiar type of fastener. Because of this ease with which some fasteners can be removed from the objects they hold together, they provide little security. Wheels held together with lug nuts or lug bolts, for instance, can be removed from a vehicle with a common tire iron.

Security fasteners on the market are touted as tamper-proof but are easily defeated using common tools. Some such fasteners, those used as lug nuts on car wheels for instance, use a cylindrical body with an etched pattern on the face or body of the fastener. A socket that fits into the etching can loosen or tighten the fastener. Similarly, many other types of security nuts can be loosened by gripping the nut with a pipe wrench, a locking wrench or even a spanner type wrench.

Using existing security nuts require torque when tightening. Damage to the fastener in high torque situations occurs. This commonly happens when tire lug nuts are tightened by auto mechanics using pneumatic tools.

There is a need in the industry for an apparatus that is easy to use, inexpensive, and provides a durable fastener that can be used for security purposes when joining objects.

SUMMARY OF THE INVENTION

The invention provides, in one aspect, a fastener assembly comprising a threaded fastener having a threaded shaft and a head coupled to the threaded shaft, an engagement member having a central cavity and an outer profile having a plurality of notches cut therein to define an engagement feature that is engageable by a torquing member, a retention member configured to engage the engagement member and retain the head of the threaded fastener within the central cavity of the engagement member, and a lower base threaded on the threaded shaft and into abutment with the engagement member and/or the retention member.

The invention provides, in another aspect, a method of assembling a fastener assembly. The method includes inserting a head of a threaded fastener into a central cavity of an engagement member, the engagement member defining an engagement feature that is engageable by a torquing member. The method further includes coupling a retention member to the engagement member such that the head of the threaded fastener is retained within the central cavity. The method further includes threading a lower base onto the threaded fastener. The method further includes abutting the lower base against the engagement member and/or the retention member such that the retention member is encased between the engagement feature and the lower base.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
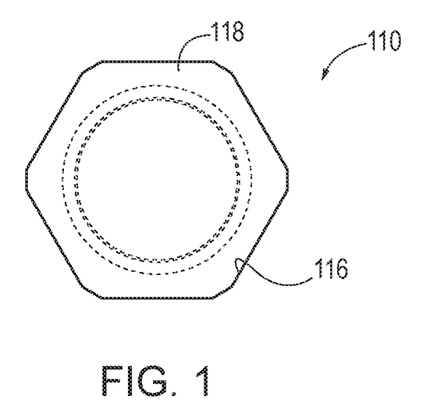
FIG. 1 is a top view of a threaded fastener of the fastener assembly.
Figure 2:
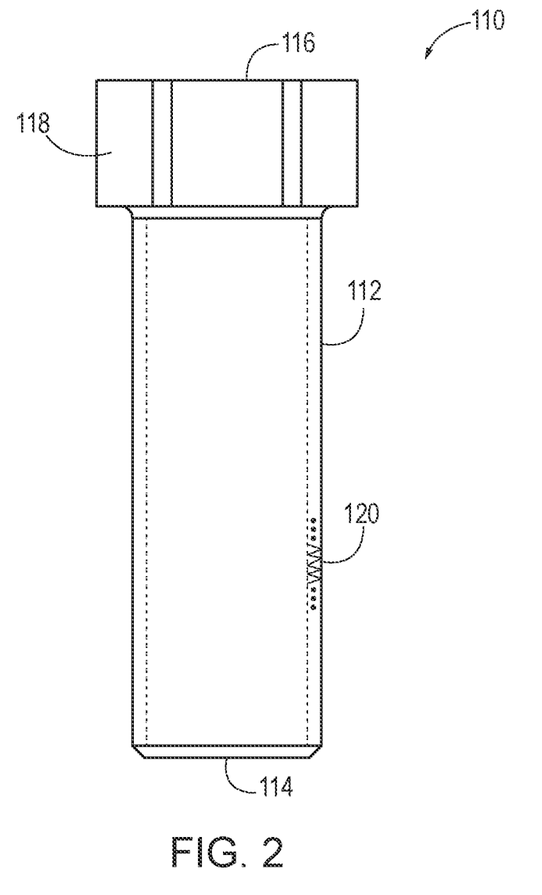
FIG. 2 is a front view of the threaded fastener of FIG. 1.

The fastener assembly 100 (FIG. 6) includes four components, a threaded fastener 110, a lower base 130, an engagement member 150, and a retention member 170. FIGS. 1 and 2 illustrate the threaded fastener 110. The threaded fastener 110 includes a threaded shaft 112 extending in a lengthwise direction from a first lengthwise end 114 towards a second lengthwise end 116. External threads 120 run along the full length of the threaded shaft 112 and provide a mounting location for the lower base 130. A hexagonal head 118 is coupled to (e.g., formed integrally with) the threaded shaft 112 and extends from the threaded shaft 112 to the second lengthwise end 116. In some embodiments, the head 118 may have a cross-section (perpendicular to the lengthwise direction) that is different than the generally hexagonal shape shown in FIG. 1. For example, the cross-sectional shape of the head 118 may be circular, square, or a further polygonal (e.g., octagonal) shape. In some embodiments, the threaded fastener 110 is a bolt.

Figure 3:
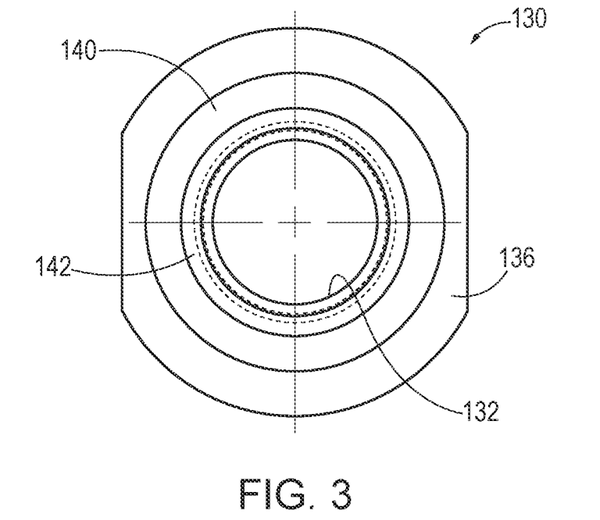
FIG. 3 is a top view of a lower base of the fastener assembly.
Figure 4:
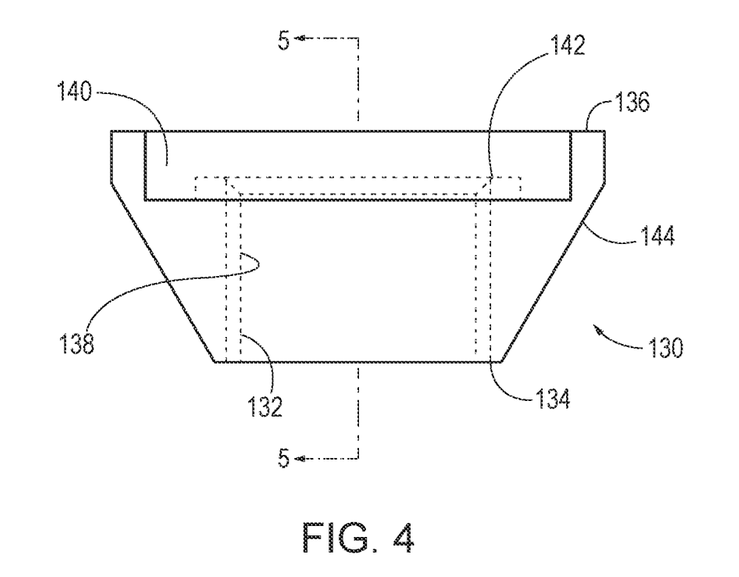
FIG. 4 is a front view of the lower base of FIG. 3.
Figure 5:
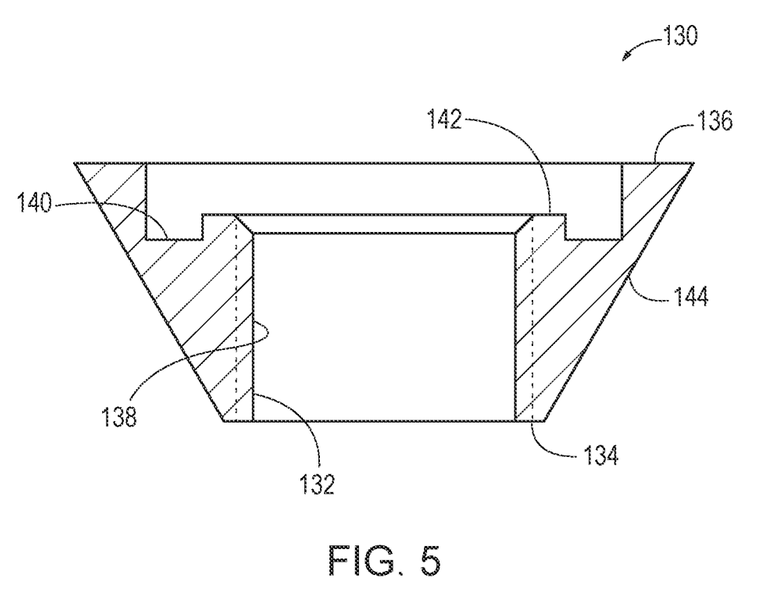
FIG. 5 is a cross-sectional view of the lower base through line A-A.

FIGS. 3-5 illustrate a lower base 130. The lower base 130 is annular, having a central through-hole 132 extending from a first lengthwise end 134 to a second lengthwise end 136 of the lower base 130. The through-hole 132 defines an axial passage for accepting the shaft 112 of the threaded fastener 110. More specifically, the through-hole 132 includes internal threads 138 sized to engage the external threads 120 of the threaded fastener 110. An annular recess 140 surrounds the through-hole 132 and extends from the second lengthwise end 136 toward the first lengthwise end 134, terminating at a location therebetween. More specifically, the annular recess 140 extends approximately one-third (e.g., 25-40%) of length of the lower base 130.

The first and second lengthwise ends 134, 136 of the lower base 130 are generally planar, parallel to one another, and perpendicular to the lengthwise direction. The first lengthwise end 134 is a planar disc interrupted by the through-hole 132 and the second lengthwise end 136 is a planar disc interrupted by the through-hole 132 and the annular recess 140. The annular recess 140 is radially spaced apart from the through-hole 132, though as shown in FIG. 5, the recess 140 may connect to the through-hole 132. As shown, a stepped region 142 connects the recess 140 to the through hole 132 at a distance from the second lengthwise end 136.

An outer profile 144 of the lower base has a conical shape and is intended to sit flush against a countersunk opening in the article to which the threaded fastener 110 is coupled. For example, some wheels have a countersunk opening for receiving a threaded fastener such as a lug bolt. In other applications, the article to which the threaded fastener is coupled may have a differently shaped opening (a round countersink, a square countersink, or no countersink) and the outer profile 144 may vary to match.

The article to which the threaded fastener 110 is coupled may be a first article having a threaded bore that engages the external threads 120 of the threaded fastener 110 or may otherwise be a second article that is positioned between the head 118 and the first article and is secured to the first article via the threaded fastener 110.

Figure 6:
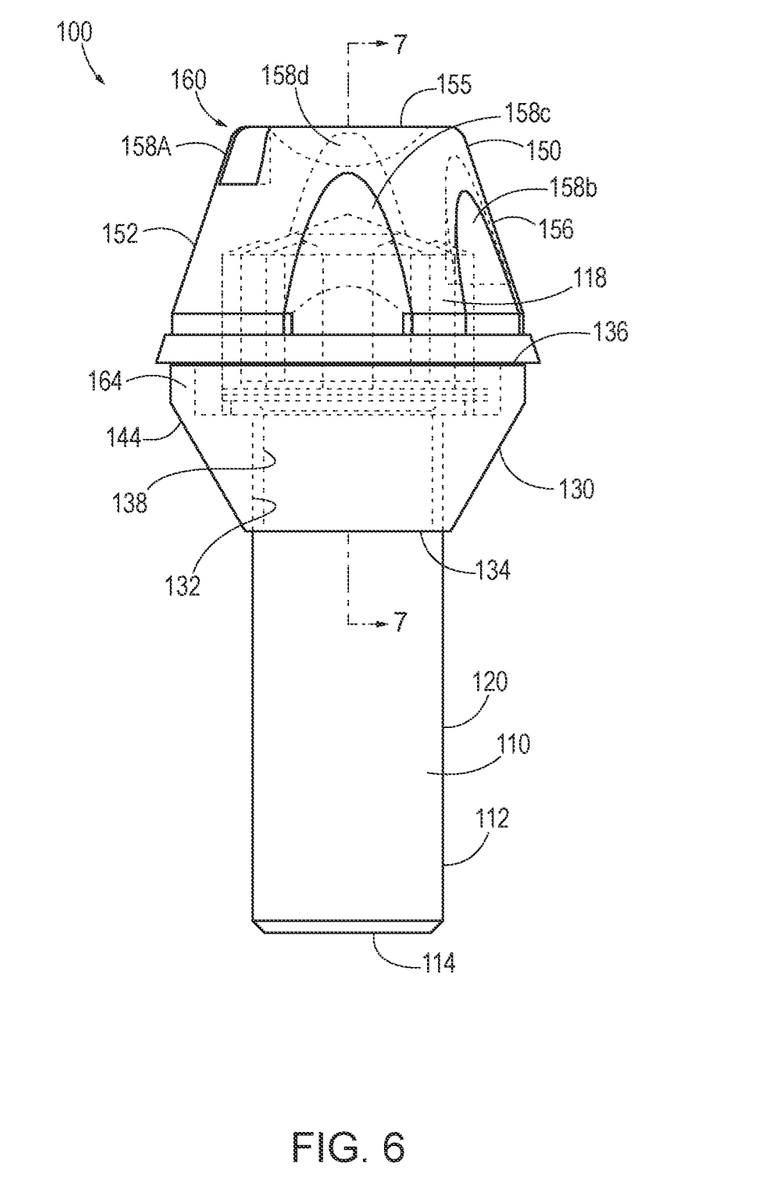
FIG. 6 is a front view of the fastener assembly.
Figure 7:
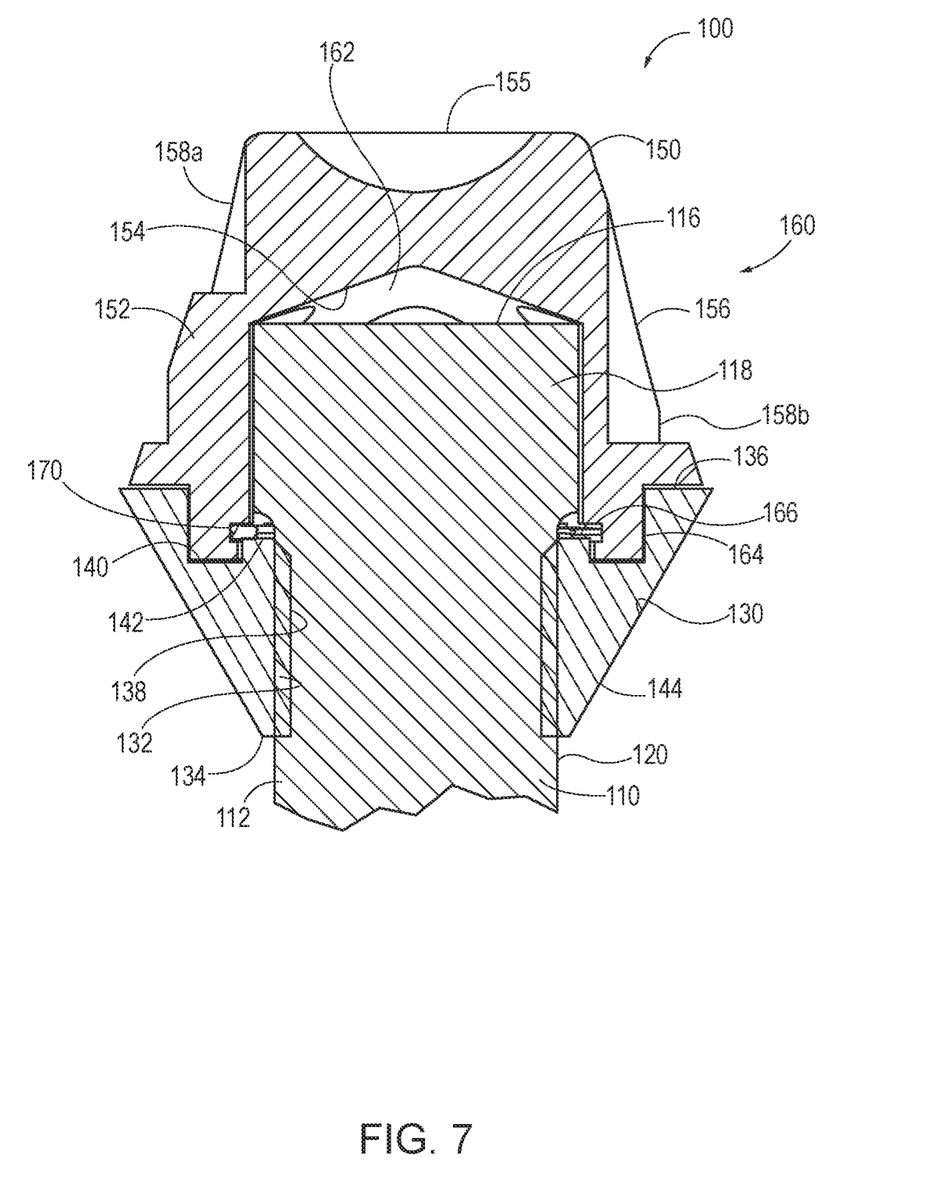
FIG. 7 is a cross-sectional view of the fastener assembly through line B-B.
Figure 8:
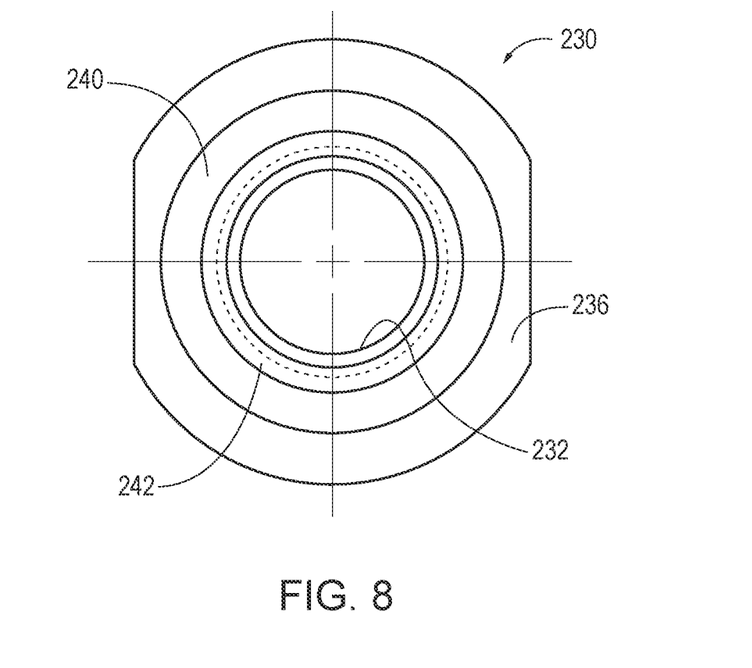
FIG. 8 is a top view of a lower base according to another embodiment.
Figure 9:
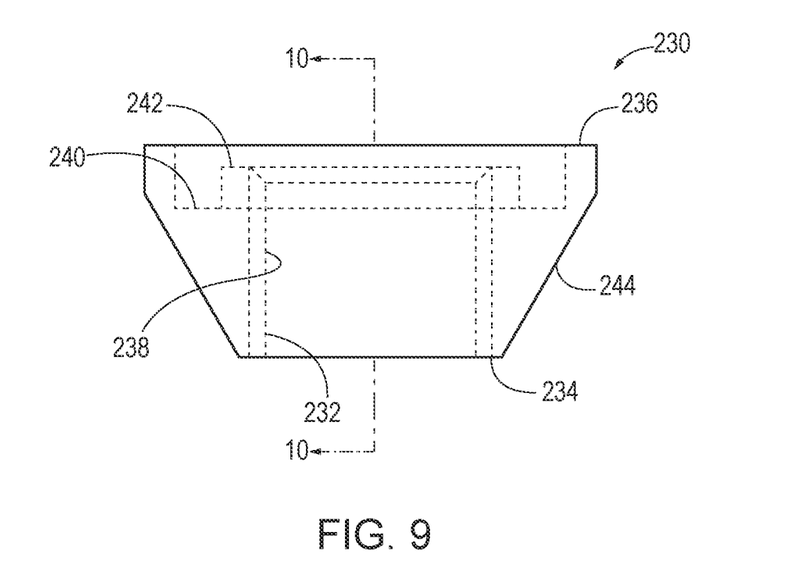
FIG. 9 is a front view of the lower base of FIG. 8.
Figure 10:
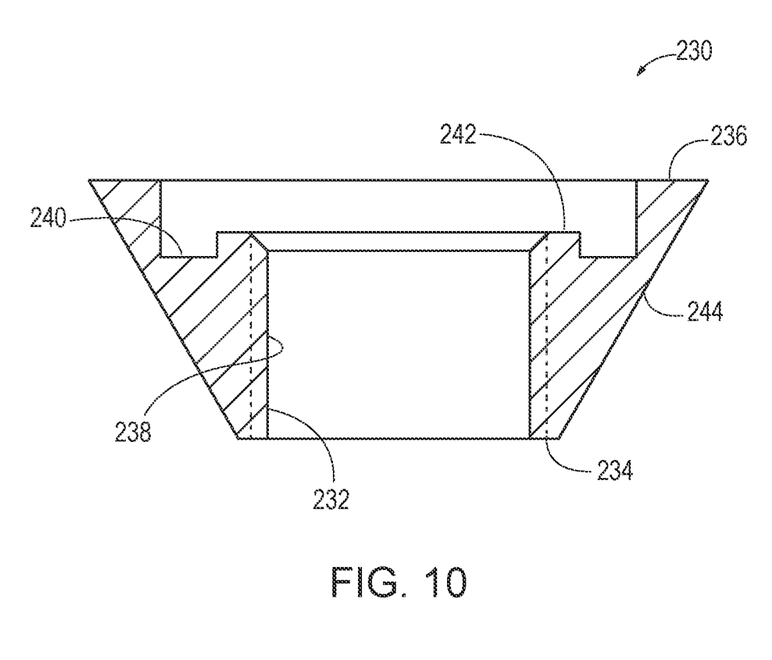
FIG. 10 is a cross-sectional view of the lower base of FIG. 8 through line C-C.
Figure 11:
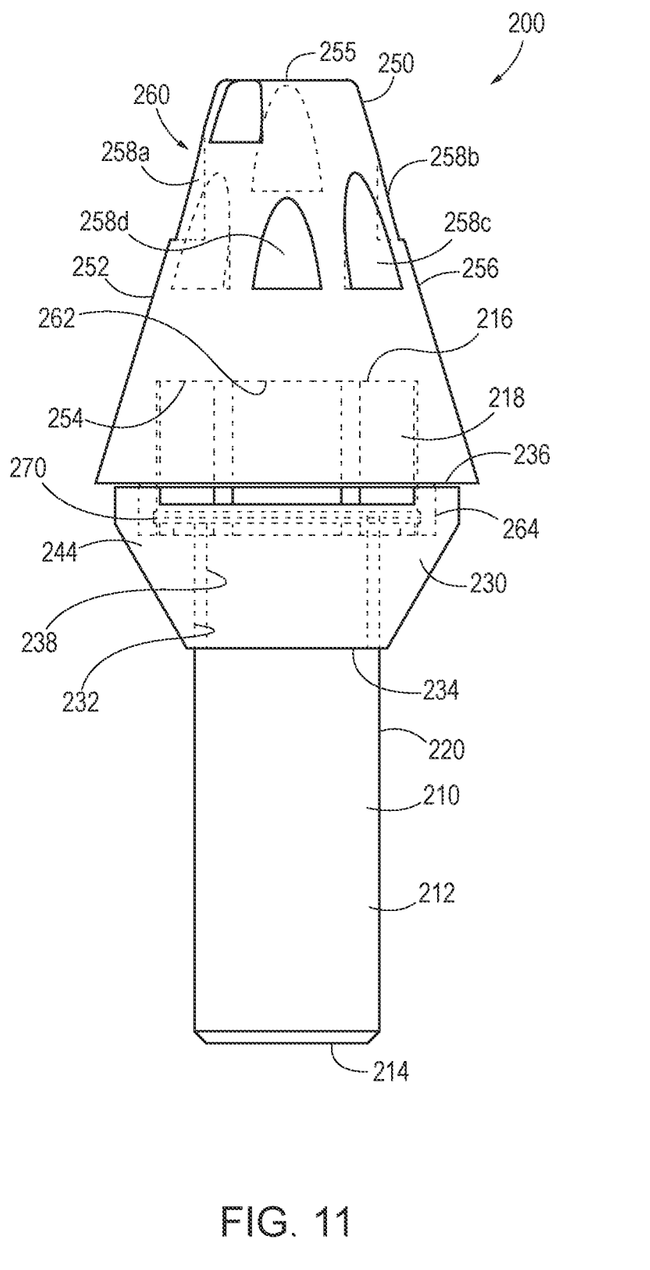
FIG. 11 is a front view of a fastener assembly having the lower base of FIG. 8.

FIGS. 6 and 7 illustrate the engagement member 150. The engagement member 150 includes an outer profile 152 for engagement by a user to rotate the fastener assembly 100 (relative to a fastened article) and an inner profile 154 for interacting with the remainder of the fastener assembly 100. The outer profile 152 has the overall shape of a truncated cone having a flat upper end 155 and an angled sidewall 156 interrupted by various notches 158A-D cut axially into the sidewall 156 at different (i.e., non-uniform) heights and/or spacings to define one of a large plurality of different potential engagement features 160 that is engageable by a torquing member (not shown) having holds spaced to seat with the notches 158A-D. Such a torquing member, when engaged with the engagement member 150, permits rotation of the fastener assembly 100 (relative to a fastened article). Without such a torquing member, the outer profile 152 is prohibitively difficult to engage, prohibiting unlicensed rotation of the fastener assembly 100. The non-uniform locations of the engagement features 160 prohibits a standard socket or wrench having a uniform inner wall pattern from engaging the engagement features 160.

The inner profile 154 engages the remaining components 110, 130, 170 of the fastener assembly 100, as shown in greater detail in FIG. 7. The inner profile 154 includes a central cavity 162 sized and shaped to snugly engage the head 118 of the threaded fastener 110. If the head 118 of the threaded fastener 110 is hexagonal as shown in FIG. 1, the cavity 162 has a similarly hexagonal shape. In this way, with the head 118 positioned within the cavity 162, rotation of the engagement member 150 results in similar rotation of the threaded fastener 110. The cavity 162 is centered relative to the truncated-cone-shaped outer sidewalls 156. A circuitous path 164 is defined between the cavity 162 and the angled sidewall 156, including numerous axial and radial portions such that the engagement member 150 seats within the annular recess 140 and against the second lengthwise end 136 of the lower base 130. The positive engagement between the engagement member 150 and the annular recess 140 of the lower base 130 creates the circuitous path 164, which extends from an exterior of the fastener assembly 100 to the threaded fastener 110 therein, which increases ease of alignment and prevents shear force applied to the engagement member 170 from acting only on the threaded fastener 110, instead transferring some of the force to the lower base 130.

As shown in FIG. 7, the inner profile additionally includes an annular cutout 166 extending radially outward from a lower portion of the cavity 162 (adjacent the circuitous path 164). The annular cutout 166 is located at a height that axially aligns with the threaded shaft 112 of the threaded fastener 110 when the head 118 is fully seated within the cavity 162. The annular cutout 166 provides a space for receiving the retention member 170. The retention member 170 may be, for example, a snap ring, formed as a substantially circular shape that axially couples the head 118 within the cavity 162 when positioned within the cutout 166.

In other embodiments, the retention member 170 may be formed as a wedge or a key that prevents removal of the engagement member 150 from the head 118. In still other embodiments, the retention member 170 may be a mechanical coupling such as a weld, a press fit, or an adhesive.

FIGS. 6 and 7 illustrate the fastener assembly 100 fully assembled with the threaded fastener 110, the lower base 130, the engagement member 150, and the retention member 170 coupled to one another. In assembly, the head 118 of the threaded fastener 110 is inserted into the central cavity 162 of the engagement member 150 with the outer profile of the head 118 engaging the walls of the cavity 162. Then, the retention member 170 is inserted into the annular cutout 166, thereby axially securing the head 118 of the fastener 110 within the cavity 162. Then, the lower base 130 is threaded over the first end 114 of the fastener 110, along the threaded shaft 112 and into abutment with the circuitous underside 164 of the engagement member 15 and/or the retention member 170, preventing access to the retention member 170. An adhesive or sealant may be located between the threads 120, 138 to prevent accidental unthreading. Additionally, or alternatively, a further retention member (e.g., a snap ring) may hold the lower base 130 in position. When fully assembled, the head 118 of the threaded fastener 110 is encapsulated within the central cavity 162 of the engagement member 150 such that the head 118 of the threaded fastener 110 is completely surrounded by the engagement member 150 and the lower base 130.

The fastener assembly 100 is then fully assembled and in condition to be inserted into a threaded aperture. A torquing member engages the various notches 158A-D to tighten the fastener assembly 100 against the article to which the threaded fastener is coupled.

Forming the fastener assembly 100 with the multiple distinct components allows different components to be formed of different materials, each having a different hardness. For example, it may be desirable to form the lower base 130 of a material that is softer than the engagement member 150 to prevent cracking of the lower base 130 upon fastening the fastener assembly 100 to the article.

FIGS. 8-11 illustrate a fastener assembly 200 according to another embodiment. Like elements are indicated with similar reference numerals, incremented by 100. In contrast to the fastener assembly 100, the fastener assembly 200 includes an axially elongated engagement member 250. The greater height of the engagement member 250 provides greater variability in the locations of notches 258A-D, thereby generating more varied engagement surfaces. Additionally, the depth of the annular recess 340 is deeper than the annular recess 140 to accommodate the larger engagement member 250.

Figure 12:
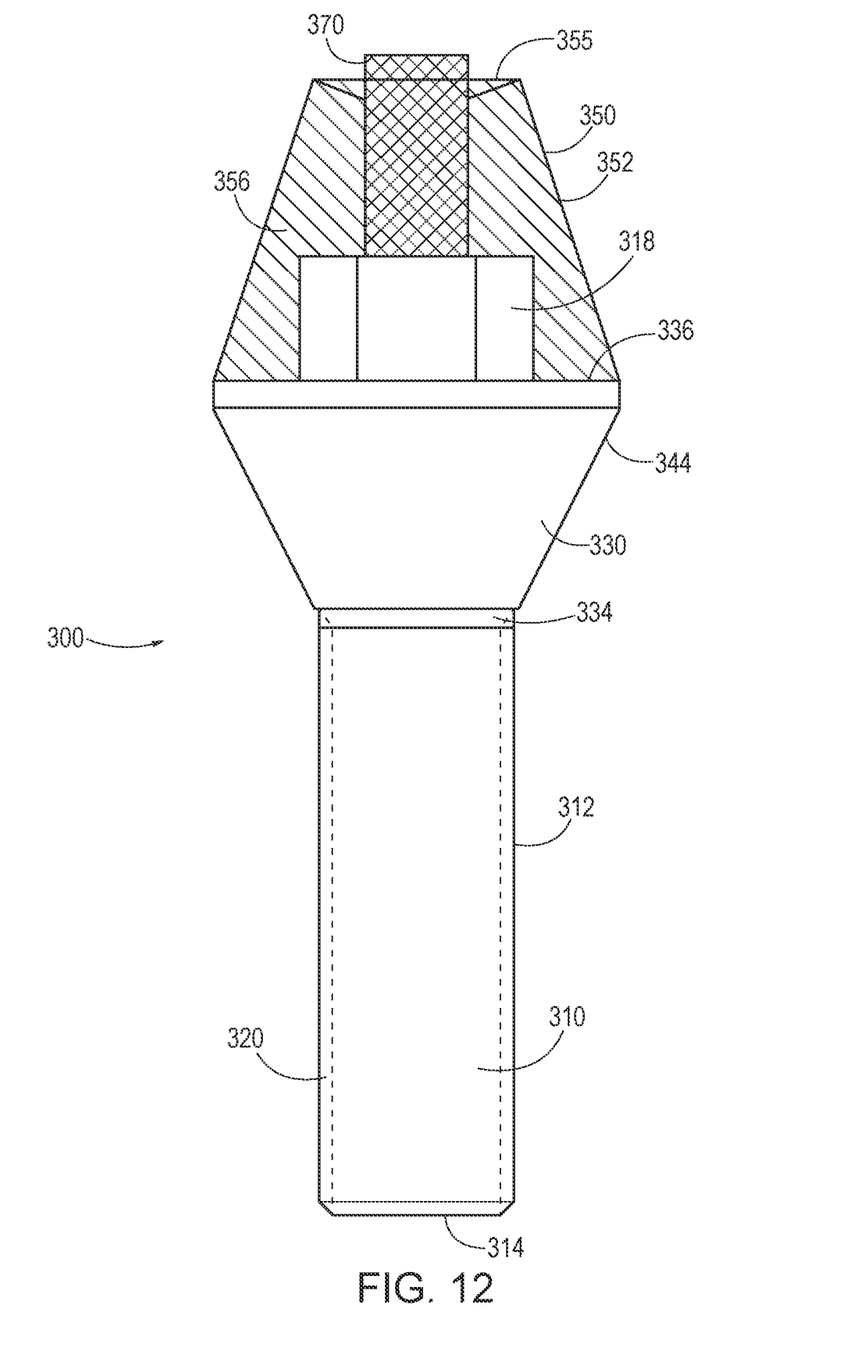
FIG. 12 is a front view of a fastener assembly according to yet another embodiment.

FIG. 12 illustrates a fastener assembly 300 according to yet another embodiment. Like elements are indicated with similar reference numerals, incremented by 200. In contrast to the fastener assembly 100, the retention member 370 is a rivet engaged to the threaded fastener 310 and extending axially from the head (similar to head 118; not shown) away from the threaded shaft 312. The rivet 370 extends through the engagement member 350 and can be engaged by a rivet gun to deform the rivet 370 and secure the engagement member 350 to the threaded fastener 310.

Figure 13:
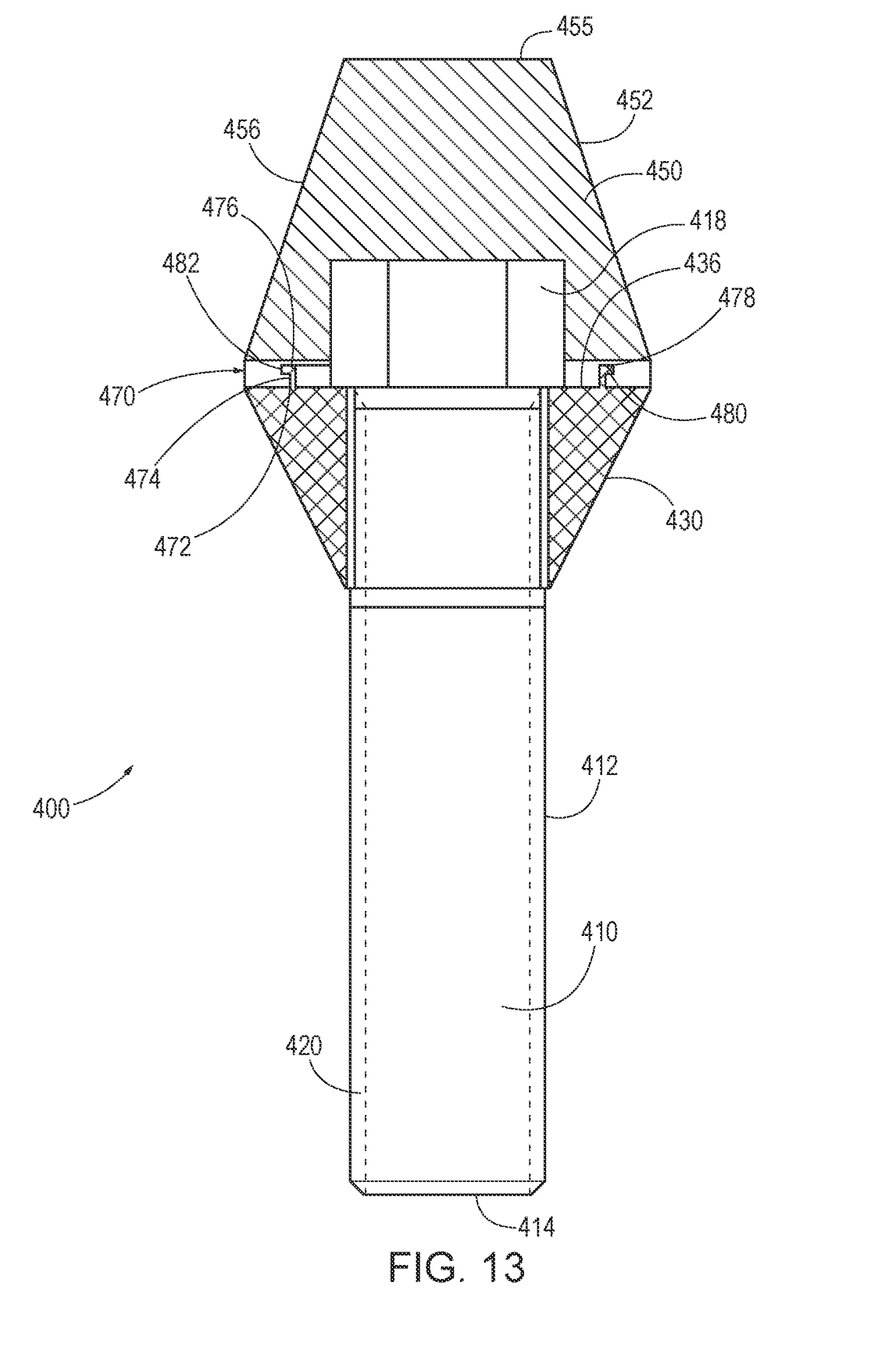
FIG. 13 is a cross-sectional view of a fastener assembly according to yet another embodiment.

FIG. 13 illustrates a fastener assembly 400 according to yet another embodiment. Like elements are indicated with similar reference numerals, incremented by 300. In contrast to the fastener assembly 100, the lower base 430 is attached to the engagement member 450 via a retention member 470 in the form of a snap engagement feature 472. The snap engagement feature 472 includes a plurality (e.g., two, three, four, five, . . . ten, etc.; two are shown in the cross-section of FIG. 13) of stems 474 and barbs 476, the stems 474 extending from the second lengthwise 436 of the lower base 430 and barbs 476 connected to the respective stems 474. The barbs 476 extend radially away from the stems 474 and have a barb surface 478 (e.g., a ramped surface) and an engagement surface 480. The barb surface 474 engages an interior of the engagement member 450 to elastically deform the snap engagement feature 472 as the engagement member 450 is coupled (e.g., axially slid on) to the lower base 430. The engagement surface 480 extends perpendicular to the lengthwise direction and seats against a parallel surface 482 of the engagement member 450 when the two components 430, 450 are fully coupled. The engagement between the surfaces 480, 482 prohibits separation of the components 430, 450. Therefore, in contrast to the fastener assembly 100, the fastener assembly 400 utilizes an integrated retention member 470 and does not utilize a separate retention member Although the invention has been described in detail with reference to certain preferred embodiments, variations and modifications exist within the scope and spirit of one or more independent aspects of the invention as described.

What is claimed is:

1. A fastener assembly comprising:
   a threaded fastener having a threaded shaft and a head coupled to the threaded shaft;
   an engagement member having a central cavity and an outer profile having a plurality of notches cut therein to define an engagement feature that is engageable by a torquing member;
   a retention member configured to engage the engagement member and retain the head of the threaded fastener within the central cavity of the engagement member; and
   a lower base threaded on the threaded shaft and into abutment with the engagement member and/or the retention member,
   wherein the central cavity is configured to engage the head of the threaded fastener such that rotation of the engagement member results in similar rotation of the threaded fastener.

2. The fastener assembly of claim 1, wherein the outer profile of the engagement member is a truncated cone interrupted by the plurality of notches, and wherein the plurality of notches are located at non-uniform positions along the height of the truncated cone.

3. The fastener assembly of claim 1, wherein the head of the threaded fastener is encapsulated within the central cavity of the engagement member such that the head of the threaded fastener is completely surrounded by the engagement member and the lower base.

4. The fastener assembly of claim 1, wherein the lower base includes an annular recess configured to receive a portion of the engagement member such that a circuitous path between the engagement member and lower base extends from the exterior of the fastener assembly to the threaded fastener.

5. The fastener assembly of claim 4, wherein the annular recess has a depth corresponding to approximately one-third of a length of the lower base.

6. The fastener assembly of claim 1, wherein an outer profile of the lower base has a conical shape.

7. The fastener assembly of claim 1, wherein the engagement member includes an annular cutout configured to receive the retention member.

8. The fastener assembly of claim 7, wherein the annular cutout is formed in the central cavity.

9. The fastener assembly of claim 7, wherein the retention member is one of a snap ring, a wedge, or a key that is received in the annular cutout.

10. The fastener assembly of claim 1, wherein the retention member is one of a snap ring, a wedge, a key, a weld, a press fit, or an adhesive.

11. The fastener assembly of claim 1, wherein the engagement member is formed of a first material and the lower base is formed of a second material having lower hardness than the first material.

12. The fastener assembly of claim 1, wherein the retention member is a snap engagement feature including a plurality of stems configured to engage a plurality of barbs to couple the lower base to the engagement member.

13. The fastener assembly of claim 1, wherein the retention member is integrated into at least one of the lower base and the engagement member.

14. The fastener assembly of claim 1, wherein the arrangement of the plurality of notches prohibits a standard socket having a uniform inner wall pattern from engaging the plurality of notches.

15. A method of assembling a fastener assembly, the method comprising:
    inserting a head of a threaded fastener into a central cavity of an engagement member, the engagement member defining an engagement feature that is engageable by a torquing member;
    coupling a retention member to the engagement member such that the head of the threaded fastener is retained within the central cavity;
    threading a lower base onto the threaded fastener; and
    abutting the lower base against the engagement member and/or the retention member such that the retention member is encased between the engagement member and the lower base.

16. The method of claim 15, wherein encasing the retention member between the engagement feature and the lower base also encases the head of the threaded fastener between the engagement feature and the lower base.

17. The method of claim 15, wherein abutting the lower base against the engagement member further comprises threading the lower base onto the threaded fastener.

18. The method of claim 15, wherein abutting the lower base against the engagement member further includes inserting a portion of the engagement member into an annular recess of the lower base such that a circuitous path is defined between the engagement member and the lower base.

19. The method of claim 15, wherein coupling a retention member to the engagement member includes inserting a snap ring, a wedge, or a key into an annular cutout of the engagement member.

20. A fastener assembly comprising:
a threaded fastener having a threaded shaft and a head coupled to the threaded shaft;
an engagement member having a central cavity and an outer profile having a plurality of notches cut therein to define an engagement feature that is engageable by a torquing member;
a retention member configured to engage the engagement member and retain the head of the threaded fastener within the central cavity of the engagement member; and
a lower base threaded on the threaded shaft and into abutment with the engagement member and/or the retention member,
wherein the outer profile of the engagement member is a truncated cone interrupted by the plurality of notches, and wherein the plurality of notches are located at non-uniform positions along the height of the truncated cone.

* * * * *